Dec. 5, 1961

H. S. FERGUSON 3,012,126

TEMPERATURE CONTROL SYSTEM

Filed July 2, 1959

INVENTOR
Hugo S. Ferguson
BY
ATTORNEYS

Dec. 5, 1961     H. S. FERGUSON     3,012,126
TEMPERATURE CONTROL SYSTEM
Filed July 2, 1959     4 Sheets-Sheet 2

INVENTOR
Hugo S. Ferguson
BY
ATTORNEYS

Dec. 5, 1961  H. S. FERGUSON  3,012,126
TEMPERATURE CONTROL SYSTEM
Filed July 2, 1959  4 Sheets-Sheet 3

INVENTOR
Hugo S. Ferguson
BY
ATTORNEYS

Dec. 5, 1961 H. S. FERGUSON 3,012,126
TEMPERATURE CONTROL SYSTEM
Filed July 2, 1959 4 Sheets-Sheet 4

INVENTOR
Hugo S. Ferguson
BY
ATTORNEYS

United States Patent Office 3,012,126
Patented Dec. 5, 1961

3,012,126
TEMPERATURE CONTROL SYSTEM
Hugo S. Ferguson, Troy, N.Y., assignor to Duffers Associates, Inc., Poestenkill, N.Y., a corporation of New York
Filed July 2, 1959, Ser. No. 824,619
32 Claims. (Cl. 219—20)

This invention relates to temperature control systems and particularly to the precise control of temperature in systems employing A.-C. current heating. The invention is especially directed to a system wherein a test specimen is passed rapidly through a heating cycle, with precise control of temperature throughout the cycle. However, certain features of the invention are also useful in other applications, as in the precise control of electric furnaces, etc.

In metallurgical tests it is often desired to examine the behavior of metals under high temperature conditions, and in many cases it is important to know the behavior as the temperature varies. For example, the behavior of metals under welding conditions is very important. During a welding operation the metal is heated very rapidly to a high temperature, and commonly cools more slowly. The heating cycle may be comparatively short, and important changes may take place due to the rapidly varying temperature.

It is very useful to have apparatus available which can subject test specimens to a temperature program which simulates that encountered in practice, so that the desirable and undesirable characteristics of various materials can be assessed. To accomplish this, it is necessary to know the instantaneous temperature of the specimen throughout the cycle, and to control the heating to yield the desired temperature variation.

It has heretofore been proposed to heat a specimen with A.-C. current and measure the temperature of the specimen with a thermocouple attached thereto. The voltage output of the thermocouple is compared with a reference voltage varying in a desired manner, and the difference therebetween amplified and used to control the supply of heating current. Since thermocouple outputs are small, it is necessary to employ a very high gain amplifier in order to get adequate control signals as the specimen approaches the desired temperature.

For rapid heating of even fairly small specimens, say rods approximately a quarter inch in diameter, high currents of the order of many thousands of amperes may be required in order to raise the metal to a high temperature in a short time. This results in a voltage drop across the specimen, and perhaps electric and magnetic fields, which interfere with the temperature measurement. Accordingly, the heating current is allowed to flow only during alternate cycles, and the difference between the thermocouple and reference signals is gated so that control signal pulses are produced in the intervals during which there is no current flow. Due to the very high gain required in the amplifier, there is a tendency for the pulses at the output of the amplifier to overshoot at their trailing edges. These overshoots are of opposite polarity and hence sometimes result in supplying more heat to the specimen when the temperature is already above the desired level, and vice versa. It has been attempted to improve the operation by providing a narrow gate at the output of the amplifier to select the mid-portion of the initial pulse. Since the narrow gate must lie within the initial gate, it has been found that adjustment is critical and frequent readjustment required.

Another factor is also important. Materials at high temperature generate a considerable amount of thermionic noise, and such noise is generated both in the test specimen and in the thermocouple itself. Also noise of different origin is often encountered. With the high gain required for accurate temperature control, such noise is often sufficient to trigger the heat control circuits and cause faulty operation.

Accordingly, it is a primary object of the present invention to provide a control system in which the temperature of an object can be varied rapidly in accordance with a desired program cycle, with precise control of temperature throughout the cycle in a reliable manner free from the need for frequent readjustments.

In accordance with the invention means are provided for cyclically switching an A.-C. supply to produce heating current pulses, and a suitable transducer is employed which is responsive to the temperature produced by the current pulses and yields a corresponding electrical signal. A reference electrical signal source produces a signal corresponding to the desired temperature program. The difference between the transducer and reference signals is applied to a signal pulse generating circuit containing a capacitor, and switch means is provided so that the capacitor is periodically charged in accordance with the difference signal, advantageously during intervals between the heating current pulses. The switch means and capacitor are arranged so that the capacitor is discharged through a load impedance at the end of each charging interval. Advantageously the charging time constant is made substantially longer than the discharge time constant. The capacitor integrates the noise present during the charging interval so that the signal pulse output corresponds very closely to the D.-C. component of the difference signal. Also, when the charging takes place between heating current cycles, the signal pulse output is not affected by the A.-C. potentials and fields resulting therefrom. In the particular arrangement described hereinafter, other important advantages are present which will be described.

The signal pulses are then amplified and used to control the heating current pulses. Although it is possible to employ the signal pulses in various manners to effect the control, in a specific embodiment described hereinafter the pulses are gated and clipped so that pulses of only one polarity corresponding to below reference temperature conditions are effective, and these pulses are applied to a pulse stretcher and phase-back circuit so as to yield control pulses whose phase with respect to a reference A.-C. wave varies with the signal pulse amplitude. The resulting control pulses are then supplied through appropriate circuits to control the duration of the heating current pulses.

Advantageously the phase-back circuit is arranged so that the heating current pulses are fairly long and change only slowly, or not at all, when the specimen is considerably below the desired temperature. However, as the specimen approaches the desired temperature and the heating pulses become shorter, the rate of change increases so that there is little or no overshoot after the specimen reaches the desired temperature.

While the invention is especially directed to the heating of specimens as above described, certain features can also be employed in other applications, such as in the precise control of electric furnaces, etc. In such applications the capacitor input circuit above described is advantageous in order to provide a temperature measurement which is free of noise and unaffected by electric and magnetic fields associated with the heating current and the supplies thereof. Also, by employing a short discharge time constant of the capacitor, considerable current amplification can be obtained which reduces the amount of additional amplification required. In many such applications, the apparatus used to control the heating current pulses in accordance with the signal pulses may be greatly simplified, and such an embodiment is described hereinafter.

The invention will be described further in connection with specific embodiments thereof, wherein additional features and advantages will in part be pointed out and in part be obvious to those skilled in the art.

Figure 1:
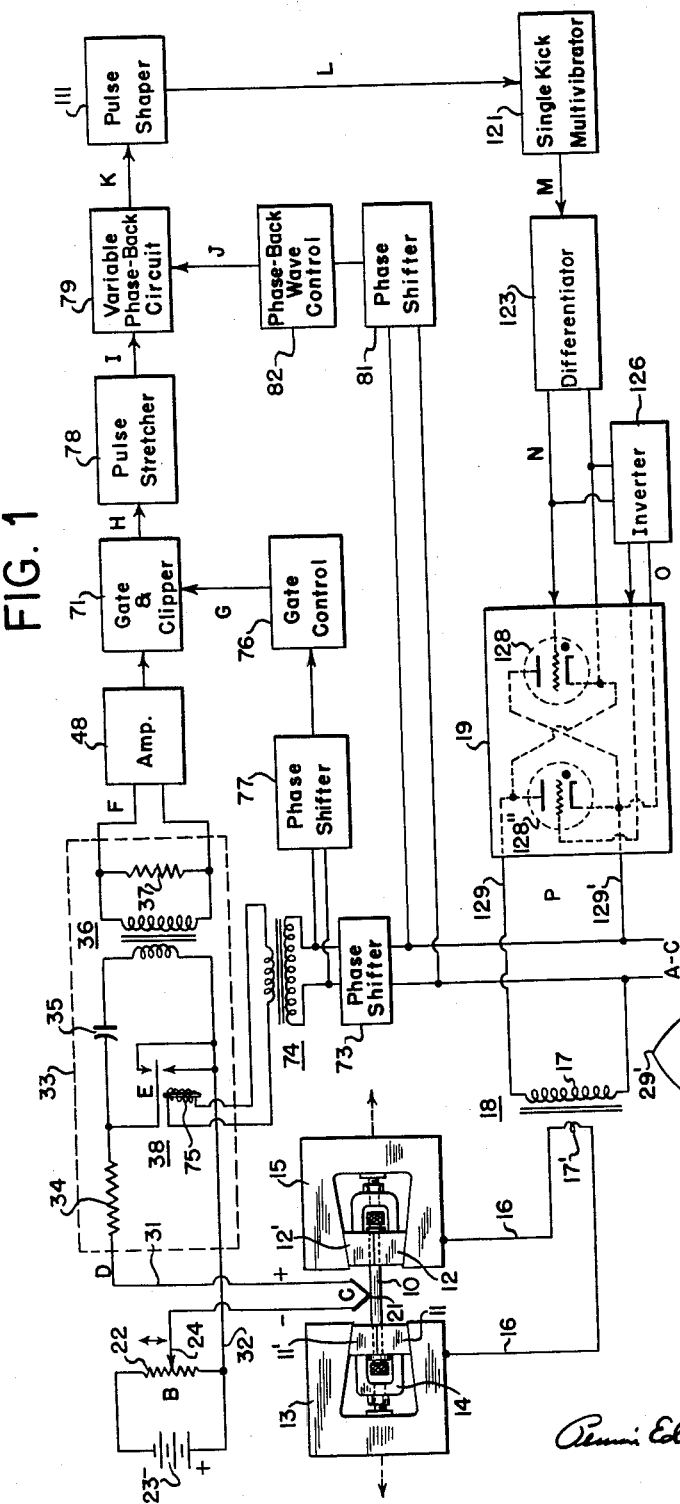
FIG. 1 shows a system in accordance with the invention for controlling the heating of a specimen.

Referring now to FIG. 1, a specimen 10 is shown held between jaws 11, 11' and 12, 12' of a test apparatus. The jaws 11, 11' have sloping outer surfaces wedged in U-shaped member 13 by a jack member 14 so that the specimen is held firmly between jaws 11, 11'. A similar construction is employed for jaws 12, 12'. Suitable means may be provided for exerting force on members 13 and 15 to apply tension to specimen 10, as indicated by the dotted arrows, and means provided for determining elongation thereof. The details of this portion of the apparatus may vary widely and form no part of the present invention. Hence further description is believed unnecessary.

Electric current is supplied to members 13 and 15 through lines 16 from the secondary 17' of transformer 18. The primary 17 is supplied from the A.-C. line through a switching circuit 19, as will be described. Members 13 and 15 are insulated from each other and arranged so that heavy currents can be supplied to the ends of specimen 10. Transformer 18 may be of the type used in welding equipment and capable of supplying very heavy currents of the order of thousands of amperes when required.

A thermocouple 21 is percussion-welded or otherwise attached to the specimen 10, and gives an output voltage varying with the temperature of specimen 10. Other types of temperature responsive transducers can be employed if desired.

The reference signal source is here shown as a potentiometer 22 with a battery 23 connected thereacross. A suitable D.-C. power supply may be employed if desired. The reference voltage may be adjusted by moving slider 24, as indicated by the arrow. In some applications the desired temperature program may be simply a constant temperature, and the position of slider 24 may be manually set. Also, if a varying temperature program is sufficiently simple, the slider may be moved manually to different positions as required. However, in the specific embodiment here shown, slider 24 is moved automatically by a suitably shaped cam, as shown in FIG. 2.

Figure 2:
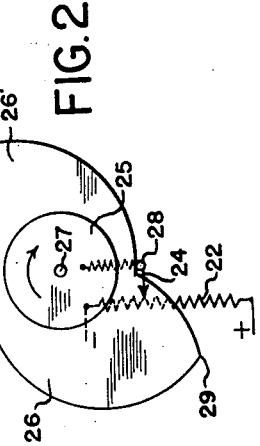
FIG. 2 illustrates a cam arrangement for producing the reference electric signal.

Referring to FIG. 2, a cam 25 having two similar segments 26, 26' is arranged for rotation about axis 27 in the direction indicated. A cam follower 28 is arranged to move slider 24 of potentiometer 22. As shown, the cam follower is in its uppermost position giving the most negative reference voltage. As will appear hereinafter, this corresponds to the high temperature position, and therefore the cam has just completed the heating portion of the cycle. This heating portion lies between the largest radius of the cam at point 29 and the smallest radius at the position shown. As the cam rotates, the follower 28 gradually moves downward during the cooling portion of the cycle. The maximum rate of cooling is determined by the rate of heat flow from specimen 10 to the structure in which it is clamped, the heat dissipation of the structure, etc. In practice, water cooling of the structure has been found desirable for short program cycles. Assuming that the desired rate of cooling is less than maximum, as the cam rotates from the position shown small amounts of heating current may be demanded in order to maintain the desired temperature. When the cam follower reaches point 29', the lowest temperature will have been reached and thereafter the temperature rises abruptly.

Single-cycle cams or multiple-cycle cams may be employed as desired, and the configuration and speed of rotation selected to pass the specimen 10 through the desired temperature program in the desired length of time.

Returning to FIG. 1, the thermocouple 21 is connected in series with the reference voltage source and the combined voltage supplied through lines 31 and 32 to the input of the signal pulse generator circuit 33. Advantageously the thermocouple and reference voltage are of opposite polarity, so that the difference between the two voltages is applied to the signal pulse generator circuit 33. This difference will be zero when the specimen is at the desired reference temperature. The polarities indicated are employed in practice but may be reversed if desired.

Signal pulse generator circuit 33 includes a series resistor 34, a capacitor 35, a transformer 36 with a resistor 37 connected across the output thereof, and a switch 38. The operation of the circuit will be explained in connection with FIGS. 3 and 4.

Figure 3:
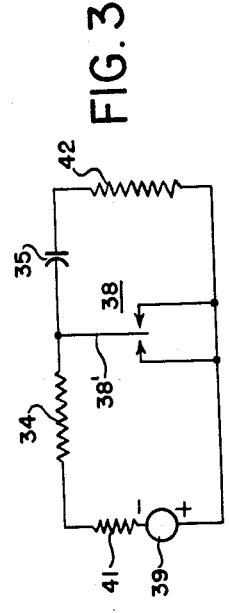
FIG. 3 is a circuit diagram explanatory of the signal pulse generator circuit.
Figure 4:
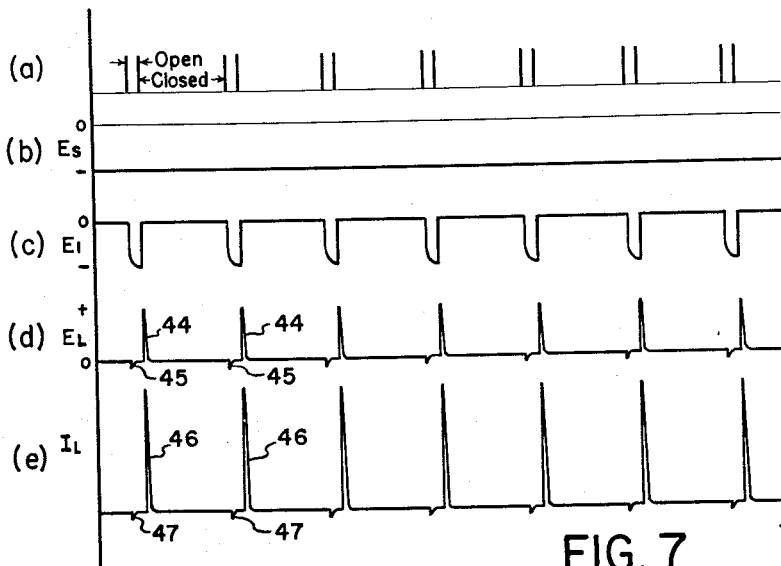
FIG. 4 shows waveforms illustrative of FIG. 3.

Referring to FIG. 3, the numeral 39 designates a D.-C. generator having an internal resistance 41. In lieu of the transformer shown in FIG. 1, the load impedance in FIG. 3 is shown as a resistor 42. The switch 38 is arranged to make contact on either side of the movable arm 38'. The open and closed intervals of switch 38 are shown at (a) of FIG. 4. The voltage output of the D.-C. generator 39 is shown at (b) in FIG. 4 and is designated $E_S$. During the open intervals of the switch, this voltage is applied to the capacitor 35 through the internal generator resistance 41, the series resistor 34 and the load resistor 42. Accordingly the capacitor is charged as shown at (c) of FIG. 4.

The rate of charging of the capacitor 35 is determined by the time constant of the charging circuit, as is well known. If the capacitor is charged essentially through resistive impedances, the time constant is the product RC, where R is the total resistance and C is the capacitance. In FIG. 3, R will be the sum of the resistances 34, 41 and 42. The charging time constant is made sufficiently long to substantially integrate noise and other undesired high frequency disturbances. At the same time, it is advantageously considerably shorter than the duration of an open interval, so that the capacitor 35 is charged to substantially the full value of the desired signal. In practice, a time constant of about one-third the duration of an open interval has been employed with success, with an open interval about ½₀ of an A.-C. period.

When switch 38 recloses at the end of an open interval, capacitor 35 is discharged through the load resistor 42. Assuming that the resistance in the switch contacts is negligible, the time constant of the discharge circuit is essentially the product of the capacitance of 35 and the resistance of 42. Advantageously, the discharge time constant is made substantially shorter than the charging time constant. Hence, voltage pulses whose duration is considerably shorter than the open switch intervals are developed at the trailing edges thereof. As shown at (d) of FIG. 4, the output voltage pulses 44 across resistor 42 rise abruptly to substantially the voltage across the capacitor 35 at the instant the switch 38 closes, and then falls somewhat more gradually as the capacitor discharges. A voltage pulse will also appear across resistor 42 during the charging of capacitor 35, since it is in the charging circuit. This is shown at 45. With the load resistor 42 substantially smaller than the series resistor 34 (plus the internal generator resistance 41) the voltage pulses 45 at the leading edges of the open switch intervals will have magnitudes which are small compared to respective pulses 44 at the trailing edges.

Since the discharge time constant is substantially shorter than the charging time constant, the peak current flowing through resistor 42 during discharge will be considerably greater than the peak current during charge as shown in FIG. 4(e). This enables a transformer to be employed to secure voltage amplification, as illustrated in FIG. 1.

While it is possible to have reactive components in the charge and discharge circuits and the overall impedances may be selected to provide appropriate time constants, the presence of inductive reactance is likely to give rise to transient oscillations. Accordingly, it is preferred to have essentially resistive elements except for capacitor 35. Thus, the secondary of transformer 36 is loaded by resistor 37 so that the combination of the transformer and loading resistor constitutes an essentially resistive load impedance. Resistor 37 is in parallel with the input circuit of amplifier 48 so that its value is selected in view of the input impedance of the amplifier and the turns ratio of transformer 36 to give the desired time constant in the discharge circuit of capacitor 35.

Continuing the description of FIG. 1, noise in the input circuit, of thermionic or other origin, will be integrated by capacitor 35 during the open switch intervals so that, at the end of each interval, the voltage across the capacitor will represent substantially the D.-C. component of the difference signal and will be nearly independent of any high frequency modulating components. Thus the voltage across the capacitor will truly represent the difference between the actual and the desired temperature of the specimen. Likewise, the output signal pulses developed across resistor 37 as the switch recloses will truly represent the temperature difference and be substantially free of extraneous signals which might produce false operation. Since the effective load impedance is small compared to the total series resistance during the open switch intervals, there will be poor signal coupling to the amplifier during these intervals and this decreases the possibility of false operation. During the closed switch intervals, the short-circuiting effect of switch 38 substantially isolates the output circuit from the thermocouple source so that noise, A.-C. potentials, etc., arising during the closed switch intervals cannot impair operation.

Figure 5:
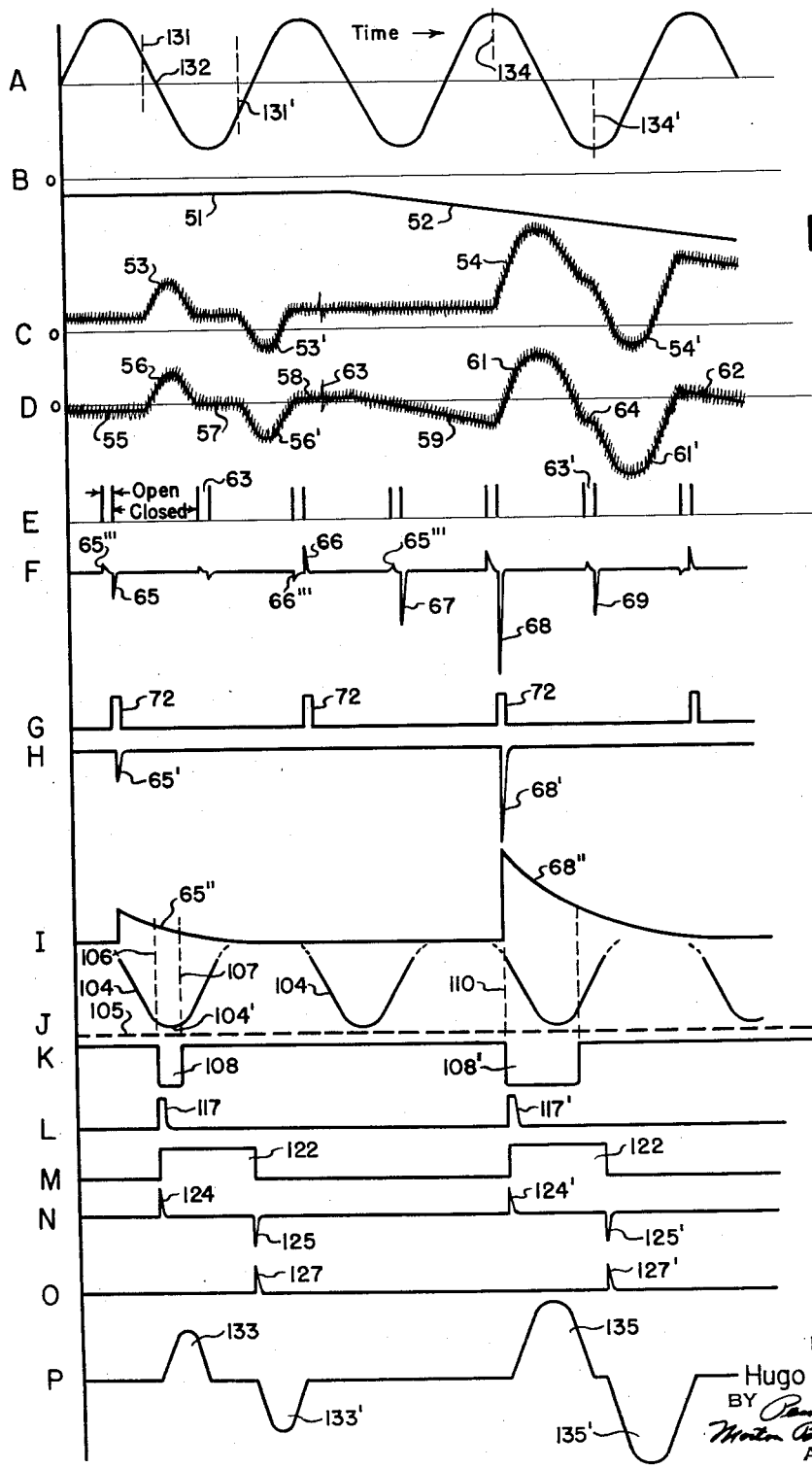
FIG. 5 shows waveforms illustrative of the operation of the complete system of FIG. 1.

FIG. 5 shows waveforms occurring in various portions of the system of FIG. 1 during the operation, capital letters in FIG. 1 designating the points at which corresponding waves in FIG. 5 are found. Before proceeding further in FIG. 1, the portions of FIG. 5 already applicable will be described.

FIG. 5(A) shows a 60-cycle sine wave corresponding to the A.-C. line voltage. This will be used as a reference for subsequent waveforms. FIG. 5(B) represents a portion of the reference signal cycle. The horizontal portion 51 is a constant negative voltage corresponding to a constant temperature desired at that portion of the cycle. The portion 52 slopes downward in the negative direction, calling for a higher specimen temperature. FIG. 5(C) represents the voltage output of thermocouple 21. Portions 53, 53' and 54, 54' correspond in time to heating current pulses shown in FIG. 5(P), and are due to stray pickup therefrom. The generation of the current pulses will be described hereinafter. The horizontal portions in FIG. 5(C) are at slightly different levels to indicate slightly different specimen temperatures.

Since the thermocouple and reference voltages are of opposite polarity, the resultant difference voltage wave shown in FIG. 5(D) is obtained. This is the voltage applied to the input of the signal pulse generator 33. Portion 55 is slightly negative, indicating the need for a slight amount of heat which is provided by the following heating pulse which produces the voltage 56. This small amount of heating is assumed to bring the specimen to the required temperature, as indicated by the line segment 57. However, as will appear hereinafter, due to the use of a transformer to supply heating current, an additional heating pulse resulting in the negative voltage wave 56' is produced, and raises the specimen temperature slightly above reference, as shown at 58. Then, when the reference voltage changes to demand more heat, the resultant voltage drops along line 59 and results in larger heating pulses producing waves 61, 61'. The additional heating brings the specimen up to nearly the correct temperature, as shown at 62. Segment 62 still slopes downward since the reference signal continues to demand a higher temperature.

The fine zigzag lines in (C) and (D) of FIG. 5 represent noise in the signal which may be of thermionic or other origin. Occasional spikes of larger amplitude may arise, such as shown at 63.

FIG. 5(E) shows the open and closed intervals of switch 38. The phasing with respect to the heating pulses is selected so that open intervals lie between the voltage pulses produced by the heating pulses. Thus, open interval 63 coincides in time with portion 57 of the resultant signal and open interval 63' coincides with portion 64. The duration of 64 is less than 57, since the heating pulses are longer so as to bring the specimen up to temperature rapidly. Advantageously, the control of the heating current pulses and the phasing of the system are predetermined so that sufficient intervals between heating pulses are provided for the open switch intervals even when maximum heating is being produced.

The voltage output of the signal pulse generator 33 is shown in FIG. 5(F). It will be noted that when the resultant signal is only slightly negative, as shown at 55, a signal pulse 65 of only moderate amplitude is produced. Only a very small pulse is produced for the signal 57 since the specimen is substantially at the proper temperature. When the specimen temperature is slightly above the desired temperature, a positive pulse 66 of moderate amplitude is produced. As the specimen goes below the desired temperature, negative pulses 67 and 68 of increasing amplitude are obtained. Then, as the specimen is brought closer to the desired temperature, the signal pulses decrease, as shown at 69. It will be clear that the output signal pulses from circuit 33 which are produced at the trailing edges of the open switch intervals vary in magnitude with departures of the resultant signal from its balanced (zero) value, and the pulses are of opposite polarity for below and above reference temperature conditions.

Amplifier 48 may be designed to saturate when the input signal pulses reach a given value so that maximum heating is provided whenever the specimen is below temperature by a given amount. For example, in one specific embodiment the amplifier saturates for signals of the order of three or four millivolts peak amplitude corresponding to a specimen temperature approximately 200° F. below reference temperature. Thus, when the specimen is far below the desired temperature, maximum heating is provided until it comes approximately within 200° of the final temperature, whereupon the rate of heating is gradually decreased as the specimen comes up to temperature to avoid overshoot.

It will be observed from FIG. 5(F) that the trailing edge pulses 65, 66, 67, etc., are preceded by leading edge pulses 65''', 66''', 67''', etc., of opposite polarity. The leading edge pulses will be smaller in amplitude than the trailing edge pulses with the time constant relationship above described, but will increase as corresponding trailing edge pulses increase. Thus, leading edge pulse 66''' may have an amplitude sufficient to trigger the following circuits to supply more heat to the specimen. Yet the specimen is already slightly above the desired temperature.

To prevent such false operation a gating and clipper circuit 71 is provided in FIG. 1, designed to give pass intervals 72 as shown in FIG. 5(G). These pass intervals coincide with the trailing edge pulses, but are phased to prevent passage of leading edge pulses. The circuit 71 is also arranged to pass only pulses of one polarity corresponding to below temperature conditions. With the polarities assumed in this embodiment, the gate and clipper stage 71 is arranged to clip off and eliminate all positive pulses, allowing only negative pulses to pass therethrough. Thus, output pulse 65' corresponds to input pulse 65 and output pulse 68' corresponds to input pulse 68. Due to limitations imposed by transformer operation, as will be described hereinafter, the gate is arranged to pass pulses only during alternate open intervals. Thus, there are no output pulses corresponding to input pulses 67 and 69.

In order to eliminate leading edge pulses, the gating intervals 72 could be longer than shown, provided the leading edge was properly phased to cut off leading edge pulses. However, it is advantageous to make the gating intervals 72 only wide enough to pass the desired trailing edge pulses of one polarity. Thus, any noise or extraneous signals entering the amplifier 48 or produced therein are eliminated. In actual practice, gating intervals 72 are made narrower than that shown so as to be of approximately the same width as that of the trailing edge pulses.

It will be appreciated from the description so far that the open switch intervals and the gate intervals must be phased properly with respect to each other and with respect to the heating current pulses. As shown in FIG. 1, the proper phase relationships are obtained by using the A.-C. line as the reference and providing suitable phase shifters. Thus, the A.-C. line voltage is fed through phase shifter 73 and transformer 74 to the actuating coil 75 of the switch 38. Switch 38 may be of conventional design, such as the type commonly known in the art as a "chopper." These choppers are arranged so that the switch contacts are closed throughout most of the respective half-cycles of the applied current, and move rapidly from one contact to the other as the applied current goes through zero. The relative durations of open and closed intervals are commonly adjustable to some extent. Such choppers are commonly designed to operate at low voltage, say 6.3 volts, whereas heavy current heating equipment is commonly designed to operate at a higher voltage, such as 220 or 440 volts. Hence, a step-down transformer 74 is shown in FIG. 1.

As will be explained hereinafter, the maximum duration of the heating current pulses will depend on the phase of the trailing edge pulses with respect to the A.-C. line voltage. Phase shifter 73 permits adjusting the phase of the open switch intervals, and consequently that of the trailing edge pulses, so that there are gaps between heating current pulses sufficient to accommodate the open switch intervals.

The gate control unit 76 is supplied with the A.-C. line voltage through a phase shifter 77, with suitable step-down voltage if required. Control circuit 76 is designed to provide narrow gating pulses, as shown at 72 in FIG. 5(G). The design of such pulse generating circuits is well known in the art and need not be described in detail. These pulses are applied to the gate and clipper circuit 71 which may contain a tube or transistor biased to cut off positive pulses applied thereto and pass only negative pulses. The gate pulses 72 are applied to the input of the gate and clipper circuit, or to a separate control electrode therein, so as to pass negative pulses only in the gating intervals. The design of gate and clipping circuits is well known in the art and need not be described further. If desired, the gating and clipping functions may be performed in separate stages rather than combined as shown.

It is preferred to control the heating pulses so that a large amount of heat per cycle is applied to the specimen when it is considerably below the desired temperature, and decreasing amounts of heat per cycle as the specimen approaches the desired temperature. In the embodiment shown, this is accomplished by first stretching the pulses from the gate and clipper circuit 71 in a pulse stretcher circuit 78. The stretched pulses are applied to a variable phase-back circuit 79 which is also supplied with a control wave of proper phase from circuits 81 and 82. The output of the phase-back circuit consists of pulses whose phase determines the portion of each A.-C. cycle during which heat is supplied to the specimen.

Figure 6:
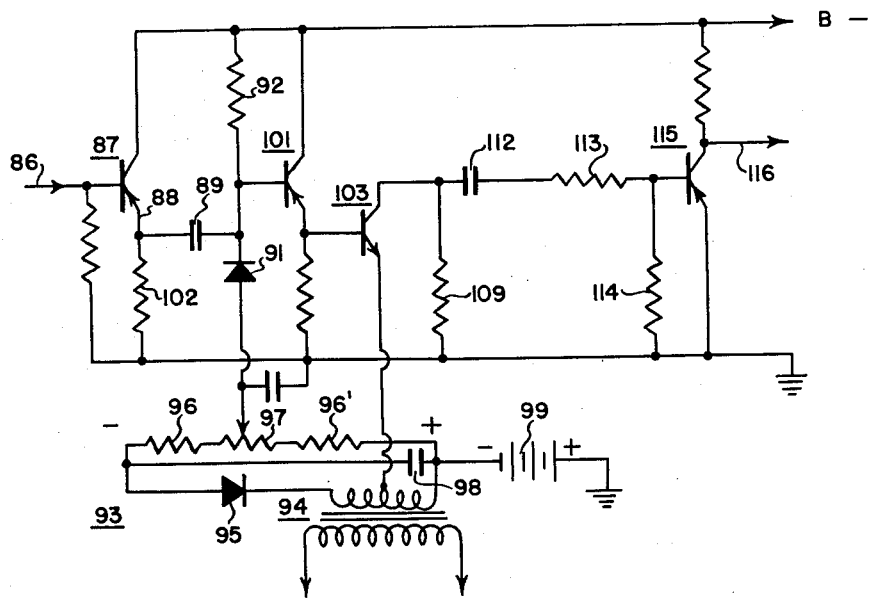
FIG. 6 is a circuit diagram of a suitable phaseback circuit.

A specific phase-back control circuit is shown in FIG. 6. This circuit employs transistors, but vacuum tubes or other arrangements may be employed if desired.

Referring to FIG. 6, output pulses from the gate and clipper stage 71 are supplied to the input line 86 connected to the base of transistor 87 of the PNP type. This transistor stage is connected as an emitter follower. Thus if input pulses such as shown at 65' and 68' of FIG. 5(H) are supplied to input line 86, pulses of like negative polarity will appear at the emitter 88 and will be applied to the capacitor 89. The other end of capacitor 89 is connected to a clamping circuit including diode 91 and resistor 92.

The clamping potential is obtained from a rectifier circuit 93 which receives A.-C. current from phase shifter 81 (FIG. 1). The phase-shifted wave is supplied through transformer 94 to a rectifier 95, series resistors 96, 96' and potentiometer 97. A filter capacitor 98 is connected across the series resistor circuit. One end of the rectifier circuit is connected to a regulated power supply available in the equipment, here represented by battery 99.

It will therefore be seen that the clamping circuit 91, 92 is connected from B— to a negative potential determined by the setting of potentiometer 97. Under no-signal conditions, a steady state condition of current flow is reached in resistor 92 and diode 91 to clamp the base of transistor 101 to a negative potential determined by the setting of potentiometer 97.

When a negative signal pulse appears across the emitter resistor 102, diode 91 conducts so that the potential of the base of transistor 101 is substantially unchanged, but capacitor 89 charges to substantially the peak value of the negative pulse. When the negative pulse has passed, the emitter 88 returns to its initial condition, which is nearly ground potential. The potential across capacitor 89 now appears as a positive-going signal at the base of transistor 101, and has a decay rate determined by the size of capacitor 89, resistor 92, the effective input impedance of transistor 101 and the back resistance of diode 91. Transistor 101 is connected as an emitter follower to maintain its input impedance at a high level.

As a result of this operation, negative signal pulses 65', 68' in FIG. 5(H) are converted into lengthened or stretched pulses 65", 68" as shown in FIG. 5(I). These lengthened pulses appear on the base of transistor 101. The initial positive amplitudes of the lengthened pulses are substantially equal to the amplitudes of the negative pulses from which they are derived, and the amplitudes thereafter decay exponentially in accordance with the time constant of the discharge circuit.

The emitter of transistor 101 is direct connected to the base of transistor 103 which is here shown as of the NPN type. In the absence of signal, the potential of the base of transistor 103 is very nearly the same as the base of transistor 101, which in turn is set by potentiometer 97. When signal pulses arrive, the lengthened pulses 65", 68" are applied to the base of transistor 103.

The emitter of transistor 103 is supplied with a phase-back control wave from the secondary of transformer 94. As here shown, the secondary is center-tapped and the midpoint connected to the emitter. The resultant voltage at the emitter is shown in FIG. 5(J). The negative-going portions of the sine wave are shown at 104, the remainder of the wave being omitted to avoid confusion. Potentiometer 97 is set so that under no-signal conditions transistor 103 has a cutoff level 105 which is slightly lower than the most negative peaks of the waves 104. Thus, under no-signal conditions, transistor 103 does not pass current.

Upon arrival of a signal pulse 65' the lengthened pulse 65'' is produced and applied to the base of transistor 103 in the positive-going direction. Initially, for a small signal, the emitter is positive with respect to the base and no collector current flows. However, as the emitter approaches its negative peak potential, the signal on the base will cause the base-emitter potential to approach zero and then reverse. At some point 106 in this region, determined by the particular type of transistor and the collector-emitter potential, collector current will flow. Current flow will continue until dotted line 107 is reached, at which point the rising portion of wave 104 causes the emitter to become positive with respect to the base and cut off collector current. Advantageously, operating conditions are selected so that the collector current rapidly saturates, thus producing a fairly rectangular voltage pulse 108 across collector resistor 109.

It will be observed that the leading edge of pulse 108 occurs considerably later than the corresponding signal pulse 65'. When a larger amplitude pulse 68'' arrives, the base potential becomes equal to the emitter potential earlier than before, as shown by dotted line 110. Consequently, the leading edge of the output pulse 108' occurs earlier. As shown, pulse 108' starts substantially simultaneously with signal pulse 68', and eventually results in producing the maximum heating for which the system is designed. With respect to the reference A.-C. wave in FIG. 5(A), output pulse 108 is phased back more than 108', since it occurs later in its particular cycle, and produces less heat.

As will be noted from (I) and (J) of FIG. 5, the slopes of both the decaying stretched pulses 65'', 68'' and the control waves 104 enter into determining the phase-back of the output pulses 108, 108' for input pulses of different initial amplitude. The sinusoidal form of waves 104 is preferred so that the rate of change of phase with input pulse amplitude is smaller for large pulse amplitudes and larger for small pulse amplitudes. This brings the specimen up to the desired temperature rapidly without appreciable overshoot. The decay of the stretched pulses facilitates this action. However, other shapes of control waves are possible, such as repetitive linearly varying waves. Also, the stretched pulses may be generated so that there is little or no decay during their effective intervals.

The leading edges of pulses 108, 108', etc., are used to control the cyclic switching of A.-C. current to the specimen. As shown generally in FIG. 1, the pulses are first reshaped in pulse shaper 111 to provide shorter pulses, and the latter are used to trigger a multi-vibrator which in turn controls the switching.

In the specific circuit of FIG. 6 the output pulses from transistor 103 are supplied to a differentiating circuit comprising capacitor 112 and resistors 113, 114. The differentiated pulses are supplied to the base of transistor 115, here shown as a PNP type, and the transistor is connected so as to be substantially non-conducting in the absence of signals.

For negative-going pulses as shown on FIG. 5(K), the leading edges of the pulses will produce negative spikes at the base of transistor 115. Corresponding positive-going pulses will be produced in the output line 116, as shown at 117, 117' in FIG. 5(L). The positive spikes at the trailing edges of pulses 108, 108' will not produce pulses in the output line 116, since they are in the direction beyond cutoff.

Transistor 115 is operated as an over-driven amplifier, so that the amplitude of the output pulses is substantially constant. The resistor 113 forming part of the differentiating circuit also serves to limit base current in transistor 115.

The phase of the cyclically recurring waves 104 in FIG. 5(J) is adjusted by means of the phase shifter 81 so that for signal pulses of small amplitude only short heating pulses are supplied to the specimen, whereas for larger signal pulses larger heating pulses are supplied. As here shown, the phase of the waves 104 is approximately 90° with respect to the reference voltage in FIG. 5(A). This phase may depart somewhat from 90° depending on phase shifts in other parts of the system.

Continuing with the description of FIGS. 1 and 5, output pulses 117, 117' from pulse shaper 111 are applied to a multi-vibrator circuit 121 of the type often referred to as a "monostable" or "single kick" multi-vibrator. As shown in FIG. 5(M), the multi-vibrator is designed to provide an output rectangular pulse 122 for each applied pulse 117, 117'. The duration of the pulse 122 is made substantially equal to a half-cycle of the A.-C. power supply.

The output of multi-vibrator 121 is then supplied to a differentiator 123 which produces pulses of opposite polarity at leading and trailing edges, as shown in FIG. 5(N). Differentiated pulses of one polarity, here assumed to be the positive differentiated pulses 124, 124', are employed in the control of the switching circuit 19 to supply heating current of one polarity to the specimen. The differentiated pulses 125, 125' of opposite polarity are inverted in inverter 126 to produce positive pulses 127, 127' as shown in FIG. 5(O). These inverted pulses control the supply of heating current of opposite polarity to the specimen. Advantageously the inverter circuit 126 is arranged to clip off pulses corresponding to 124, 124'.

The switching circuit 19 may be of any suitable design to connect the A.-C. line to the transformer 18 under the control of input signals. Such circuits are commonly employed in welding apparatus and may be employed in this system with suitable modification where required.

A simplified arrangement is shown in dotted lines within the rectangle 19. Here a pair of high power, grid-controlled gas discharge tubes 128, 128' are shown. The cathode-plate circuits of the gas-discharge tubes are cross-connected between lines 129, 129'. Thus, current can flow from the A.-C. line to the transformer 18 through alternate gas-discharge tubes on positive and negative half-cycles, provided the tubes are in a conductive condition. The tubes will be fired (changed from non-conductive to conductive conditions) if the respective grids go above cutoff while the respective plates are positive to the cathodes. In this embodiment tubes 128, 128' have their grids normally beyond cutoff and suitable biasing means may be provided. When a positive pulse 124 from differentiator 123 is supplied to tube 128, that tube will fire provided its plate is then positive to the cathode, and the tube will remain conductive until the plate voltage passes through zero and becomes negative. Similarly, tube 128' will fire when a positive pulse 127 is applied to the grid thereof from inverter 126, if its plate is then positive.

Referring back to (N), (O) and (P) of FIG. 5, pulse 124 has a phase with respect to the reference voltage shown in (A) which will cause tube 128 to fire at the point indicated by the dotted line 131. Tube 128 will continue to supply current to transformer 18 until the plate voltage passes through zero at point 132. This results in a pulse of current 133 being delivered to the transformer, and hence to the specimen. The current in the transformer will not rise abruptly upon application of voltage, since the transformer will ordinarily have a large inductance. Due to this inductance, the current pulse 133 will ordinarily be fairly sinusoidal in form, although it may have different forms in different specific applications. The phase of the current pulse with respect to the applied voltage will also depend upon the transformer characteristics. In a similar manner pulse 127 will cause tube 128' to fire at the point indicated by the dotted line 131' in the next half-cycle, producing the current pulse 133'.

Pulse 124' is phased-back less than 124 so that when it is applied to tube 128, the A.-C. voltage is substantially at its peak value as indicated by line 134. Accordingly a much larger current pulse 135 will be supplied to transformer 18. In the negative portion of this cycle, pulse 127' will trigger tube 128' at the point shown by line 134', thus resulting in the negative current pulse 135'. For phase-back of the pulses 124 and 127 other than those shown, the tubes 128, 128' will be triggered at various points between the zero voltage point at 132 and the maximum indicated at 134.

The power factor of the transformer is important in determining the points on the A.-C. wave at which voltage is applied to the transformer to obtain maximum current pulses while still leaving a gap between successive pulses. Phase-shifter 73 permits adjusting the phase of the open switch intervals with respect to the A.-C. wave to obtain this result.

For large heating currents, large transformers will be employed at 18, and in such transformers it is undesirable to have appreciable D.-C. current components. This is the primary reason for employing symmetrical positive and negative current pulses 133, 133' and 135, 135'. Due to the operation described for the multi-vibrator 121 and ensuing circuits, it will be seen that one signal pulse 65 in (F) results in two symmetrical current pulses 133, 133'. Similarly, one signal pulse 68 results in two symmetrical current pulses 135, 135'. It will be noted that the gate pulses 72 shown at (G) eliminates signal pulses which may be produced on alternate half-cycles, so that the control of switch 19 is effected by signal pulses occurring at one-cycle intervals only. If the load were purely resistive or otherwise capable of withstanding substantial D.-C. components, the system could be arranged to control the flow of current each half-cycle, and such an operation will be described in connection with FIG. 7.

Many different arrangements may be used to control the switch circuit 19 in accordance with control pulses. For example, the multi-vibrator 121 will commonly consist of two tubes or transistors which alternately are on and off. Waveform 122 at (M) of FIG. 5 shows the output from one tube. The output of the other tube will have the same shape, but will occur one-half cycle later. Consequently, the output of the second tube may be fed through a differentiator to tube 128' rather than as shown.

The overall operation of the system of FIG. 1 will be understood from the foregoing, particularly with reference to FIG. 5. With the phases properly adjusted as described, signal pulses representing the difference between the thermocouple signal and the reference signal are developed by the signal pulse generator circuit 33 in the intervals between heating current pulses. The output signal pulses of circuit 33 are gated and clipped so that only pulses of one polarity corresponding to below-reference-temperature conditions are effective thereafter. The latter pulses are then applied to a phase-back circuit which produces control pulses whose phase-back varies with the amplitude of the gated pulses applied thereto. These control pulses are used to control the firing of the tubes in switch circuit 19, and corresponding current pulses are supplied to heat the specimen.

As an example of the accurate control that can be maintained, in one embodiment the specimen was passed through a temperature program varying from room temperature to approximately 2200° F. in 10 seconds, and back to room temperature in an overall cycle of approximately three minutes. The temperature was held within about 15° of the desired temperature during heating, and within about 3° at maximum and during cooling. The lag of 15° during heating was due to limitations in maximum rate of heating, and would be less for somewhat slower heating requirements.

Figure 7:
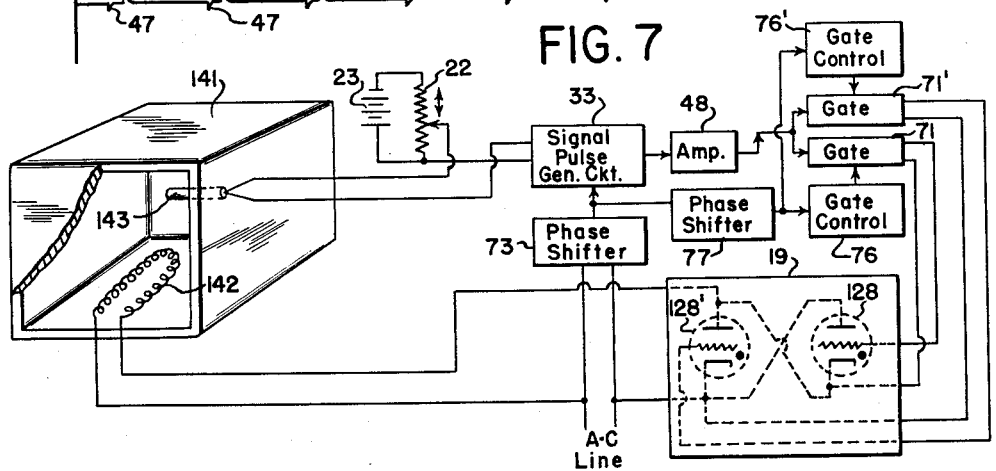
FIG. 7 shows an application of the invention to the control of an electric furnace.

Referring now to FIG. 7, an application of the invention to the control of an electric furnace is shown. The furnace comprises a suitably insulated box 141 with a heating coil 142 therein. A transducer 143 is mounted in one wall of the box so as to sense the temperature therein produced by current in coil 142, and yield a corresponding electrical signal. Since furnaces are not expected to vary in temperature as rapidly as is useful in the testing of specimens, transducers capable of giving larger outputs than a single thermocouple may be employed, even though they are not capable of as rapid response. For example, a thermopile consisting of a number of thermocouples in series may be employed. This reduces the amount of subsequent amplification required for a given sensitivity, or gives closer temperature control for the same amplification.

A reference signal source 22, 23 may be employed as before. While automatic operation by cam or other means may be provided, manual operation often suffices. A signal pulse generating circuit 33 is employed as before, and the switch therein actuated from the A.-C. line through a phase shifter 73 as described before. Amplifier 48 may be similar to that of FIG. 1, but far less gain will commonly be required if a thermopile or other comparatively large output transducer is employed.

The switching circuit 19 may be the same as before. However, if the heating element 142 is designed for operation at the voltage of an available A.-C. supply, the intervening transformer may be eliminated. In such case a D.-C. component can be tolerated and it is possible to control tubes 128 and 128' individually on respective half-cycles. To this end a pair of gates 71, 71' are employed, each similar to gate 71 of FIG. 1. Likewise, a pair of gate control circuits 76, 76' supplied from phase shifter 77 are employed.

The operation of the arrangement of FIG. 7 through the amplifier 48 is similar to that of FIG. 1, and the curves of FIG. 5(A) through (F) apply in principle. Inasmuch as transducer 143 is measuring the air temperature inside the furnace produced by heating coil 142, rather than the temperature of the heating coil itself, its output signal voltage will not have cyclic variations to as marked a degree as shown at (C) and (D) of FIG. 5. In general, the voltage output of transducer 143 will vary more smoothly, although there may be extraneous variations due to pickup from nearby circuits.

Figure 8:
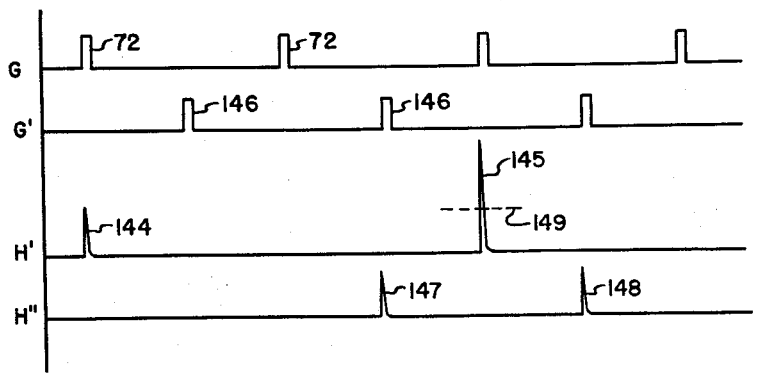
FIG. 8 shows waveforms illustrative of the operation of the system of FIG. 7.

FIG. 8(G) shows gating pulses 72 from the gate control circuit 76 and is the same as FIG. 5(G). Output pulses 144 and 145 of FIG. 8(H') are similar to those shown in FIG. 5(H) except that the polarity is inverted. In FIG. 7 the output pulses from the gates are used to control switching circuit 19 directly, and positive pulses are desired.

The gating pulses supplied from 76' to gate 71' are displaced by one-half cycle, as shown at 146 in FIG. 8(G'). Assuming that the signal pulses are the same as shown in (F) of FIG. 5, corresponding gated pulses 147 and 148 are obtained at the output of gate 71'. The output pulses from gates 71 and 71' may be applied directly to tubes 128, 128' since they are of proper polarity and phase. Thus, the firing of tubes 128, 128' will be determined by the heating demand during successive half-cycles, and a positive current pulse will not necessarily be accompanied by a negative pulse as was the case in FIG. 5(P).

Ordinarily the amount of heat supplied to the heating element 142 in a single cycle will be relatively small compared to the heat per cycle employed in the apparatus of FIG. 1. Consequently, it is unnecessary to provide the phase-back control which was especially advantageous in FIG. 1, and each pulse 144, 145, 147, 148 in FIG. 8 supplies a given amount of heat to the furnace. The phase of the pulses may be selected with respect to the phase of the A.-C. line voltage so that current flows to heating element 142 for the desired portion of a half-cycle whenever a pulse is present. This results in an extremely simple system and yet enables accurate control of furnace temperature.

In some applications, it may be unnecessary to provide gaps in the flow of current to element 142 during which the signal pulses are derived in circuit 33. However, when current flow in element 142 or the associated circuits give rise to substantial electric or magnetic fields, it is advantageous to allow current flow during only a portion of a half-cycle and to derive the signal pulses in the intervening gaps as explained before.

It may be possible in certain applications to employ only a single gate circuit in FIG. 7, with the gate passing pulses recurring at half-cycle intervals. The output of the gate would then be applied simultaneously to the grids of both 128 and 128'. A given output pulse will fire only one tube, however, since when the plate voltage of one tube is positive, that of the other is negative. Many discharge tubes such as would be employed for 128, 128' may not be capable of having their grids driven positive while the plates are negative, without adverse effects. In such case, the double gate arrangement of FIG. 7 is advantageous.

In the arrangement of FIG. 7 it is advantageous to design amplifier 48 to saturate at a signal level corresponding to the desired temperature accuracy, the saturation level giving pulses of sufficient amplitude for reliable control of the switching circuit 19. Such a saturation level is indicated by dotted line 149 in FIG. 8.

The invention has been described in connection with two specific embodiments thereof, and some alternative arrangements have been mentioned during the course of the description. It will be understood that many additional modifications may be made within the scope of the invention as meets the requirements of a particular application. Also, certain features may be omitted while retaining others.

I claim:

1. A temperature control system which comprises means for supplying electric current to change the temperature of an object, transducer means responsive to said temperature and yielding a corresponding electrical signal, a reference electrical signal source, means for combining said transducer and reference signals and supplying the combined signal to a signal pulse generator circuit including a capacitor, a load impedance and switching means, means for operating said switching means to supply said combined signal to said capacitor during predetermined intervals to charge the capacitor and to discharge the capacitor through said load impedance during the intervening intervals, and means for utilizing output signal pulses from said generator circuit to control said means for supplying current.

2. A temperature control system which comprises first switching means for supplying current to an object to change the temperature thereof, transducer means responsive to said temperature and yielding a corresponding electrical signal, a reference electrical signal source, means for combining said trandsucer and reference signals and supplying the combined signal to a signal pulse generator circuit including a capacitor, a load impedance and second switching means, means for operating said second switching means to supply said combined signal to said capacitor during predetermined intervals to charge the capacitor and to discharge the capacitor through said load impedance during the intervening intervals, and means for utilizing output signal pulses from said generator circuit to control said first switching means.

3. A temperature control system which comprises first switching means for switching an A.-C. supply to produce heating current pulses, transducer means responsive to the temperature produced by said current pulses and yielding a corresponding electrical signal, a reference electrical signal source, means for combining said transducer and reference signals and supplying the combined signal to a signal pulse generator circuit including a capacitor, a load impedance and second switching means, means for operating said second switching means to supply said combined signal to said capacitor during predetermined intervals to charge the capacitor and to discharge the capacitor through said load impedance during the intervening intervals, said charging of the capacitor having a time constant substantially longer than said discharging thereof, and means for utilizing output signal pulses from said generator circuit to control said first switching means.

4. A temperature control system which comprises first switching means for switching an A.-C. supply to produce heating current pulses, transducer means responsive to the temperature produced by said current pulses and yielding a corresponding electrical signal, a reference electrical signal source, means for combining said transducer and reference signals and supplying the combined signal to a signal pulse generator circuit including a capacitor, a load impedance and second switching means, means for operating said second switching means to supply said combined signal to said capacitor during predetermined intervals to charge the capacitor and to discharge the capacitor through said load impedance during the intervening intervals, said second switching means substantially isolating said load impedance from said combined signal during said discharging of the capacitor, and means for utilizing output signal pulses from said generator circuit to control said first switching means.

5. A temperature control system which comprises switching means for supplying electric current to an object to change the temperature thereof, transducer means responsive to said temperature and yielding a corresponding electrical signal, a reference electrical signal source, a signal pulse generator circuit including a capacitor and an output load impedance connected in series and a switch connected thereacross, means for combining said transducer and reference signals and supplying the combined signal to said circuit, means for opening said switch during predetermined intervals to charge said capacitor and reclosing the switch to discharge the capacitor through said load impedance, the time constant of said charging being sufficiently long to integrate frequency components substantially higher than the components of said signal, and means for utilizing output signal pulses from said generator circuit to control said switching means.

6. A temperature control system which comprises switching means for switching an A.-C. supply to produce heating current pulses, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for opening said switch during predetermined intervals to charge said capacitor and reclosing the switch to discharge the capacitor through said load impedance, said charging of the capacitor having a time constant substantially longer than said discharging thereof, and means for utilizing output signal pulses from said generator circuit to control said switching means.

7. A temperature control system which comprises switching means for cyclically switching an A.-C. supply to produce heating current pulses, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, said charging of the capacitor having a time constant substantially longer than said discharging thereof, and means for utilizing output signal pulses of one polarity from said generator circuit to control the cyclic switching of said switching means.

8. A temperature control system which comprises switching means for cyclically switching an A.-C. supply to produce heating current pulses in a conductor, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, said charging of the capacitor having a time constant sufficiently long to integrate frequency components substantially higher than the components of said signal and substantially longer than the time constant of discharging thereof, and means for using output signal pulses of one polarity from said generator circuit to control the cyclic switching of said switching means.

9. A temperature control system which comprises switching means for cyclically switching an A.-C. supply to produce heating current pulses in a conductor, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit through a series resistance, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, said series resistance being substantially larger than said load impedance whereby said charging of the capacitor has a time constant substantially longer than said discharging thereof, the time constant of said charging being sufficiently long to integrate frequency components substantially higher than the components of said signal, and means for using output signal pulses of one polarity from said generator circuit to control the cyclic switching of said switching means.

10. A temperature control system which comprises first switching means for supplying electric current to an object to change the temperature thereof, transducer means responsive to said temperature and yielding a corresponding electrical signal, a reference electrical signal source, means for combining said transducer and reference signals and supplying the combined signal to a signal pulse generator circuit including a capacitor, a load impedance and second switching means, means for operating said switching means to supply said combined signal to said capacitor during predetermined intervals to charge the capacitor and to discharge the capacitor through said load impedance during the intervening intervals, whereby output signal pulses are produced at the trailing edges of said predetermined intervals, gating means having pass intervals coinciding with pulses produced at the trailing edges of said predetermined intervals but phased to prevent passage of pulses produced at the leading edges thereof, and means for utilizing signal pulses from said gating means to control said first switching means.

11. A temperature control system which comprises switching means for cyclically switching an A.-C. supply to produce heating current pulses in a conductor, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, said charging of the capacitor having a time constant substantially longer than said discharging thereof, whereby output signal pulses are produced at the trailing edges of the open switch intervals respectively, gating means having pass intervals coinciding with pulses produced at the trailing edges of predetermined open switch intervals but phased to prevent passage of pulses produced at the leading edges thereof, and means for utilizing signal pulses from said gating means to control the cyclic switching of said switching means.

12. A temperature control system which comprises switching means for cyclically switching an A.-C. supply to produce heating current pulses in a conductor, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, said charging of the capacitor having a time constant substantially longer than said discharging thereof, whereby output signal pulses substantially shorter than the open switch intervals are produced at the trailing edges thereof respectively, gating means synchronized with said A.-C. supply having pass portions coinciding with pulses produced at the trailing edges of predetermined open switch intervals but phased to prevent passage of pulses produced at the leading edges thereof, and means for utilizing signal pulses from said gating means to control the cyclic switching of said switching means.

13. A temperature control system which comprises switching means for cyclically switching an A.-C. supply to produce heating current pulses in a conductor, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit through a series resistance, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, the charging circuit of said capacitor having a time constant sufficiently long to integrate frequency components substantially higher than the components of said signal and substantially longer than the time constant of the discharge circuit thereof, whereby output signal pulses proportional to said signal difference are produced at the trailing edges of the open switch intervals, gating means synchronized with said A.-C. supply having pass portions for signal pulses of at least one polarity produced at the trailing edges of predetermined open switch intervals but phased to prevent passage of pulses produced at the leading edges thereof, and means for utilizing signal pulses from said gating means to control the cyclic switching of said switching means.

14. A temperature control system which comprises means for supplying electric current to change the temperature of an object, transducer means responsive to said temperature and yielding a corresponding electrical signal, a reference electrical signal source, means for combining said transducer and reference signals and supplying the combined signal to a signal pulse generator circuit including a capacitor, a load impedance and switching means, means for operating said switching means to supply said combined signal to said capacitor during predetermined intervals to charge the capacitor and to discharge the capacitor through said load impedance during the intervening intervals, whereby output signal pulses are produced at the trailing edges of said predetermined intervals, gating and clipping means having pass intervals for signal pulses of only one polarity corresponding to below temperature conditions, said pass intervals coinciding with trailing edge pulses of said predetermined intervals but phased to prevent passage of leading edge pulses thereof, and means for utilizing signal pulses from said gating and clipping means to control said means for supplying current.

15. A temperature control system which comprises switching means for switching an A.-C. supply to produce heating current pulses, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for opening said switch during predetermined intervals to charge said capacitor and reclosing the switch to discharge the capacitor through said load impedance, whereby output signal pulses are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, and means for utilizing signal pulses from said gating and clipping means to control said switching means.

16. A temperature control system which comprises switching means for cyclically switching an A.-C. supply to produce heating current pulses in a conductor, transducer means responsive to the temperature produced by said current pulses and yielding a corresponding electrical signal, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, said charging of the capacitor having a time constant substantially longer than said discharging thereof, whereby output signal pulses are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, and means for utilizing signal pulses from said gating and clipping means to control the cyclic switching of said switching means.

17. A temperature control system which comprises means for supplying electric current to change the temperature of an object, transducer means responsive to said temperature and yielding a corresponding electrical signal, a reference electrical signal source, means for combining said transducer and reference signals and supplying the combined signal to a signal pulse generator circuit including a capacitor, a load impedance and switching means, means for operating said switching means to supply said combined signal to said capacitor during predetermined intervals to charge the capacitor and to discharge the capacitor through said load impedance during the intervening intervals, whereby output signal pulses of varying amplitude are obtained, means for lengthening output signal pulses of at least one polarity, means for producing a cyclically recurring wave substantially in synchronism with the operation of said switching means, means for producing control pulses when said lengthened pulses and cyclically recurring wave reach a predetermined relative amplitude whereby the phase of the control pulses varies with the amplitude of said output signal pulses, and means for utilizing said control pulses to control said means for supplying current.

18. A temperature control system which comprises switching means for switching an A.-C. supply to produce heating current pulses, transducer means responsive to the temperature produced by said current pulses and yielding a corresponding electrical signal, a reference electrical signal source, a signal pulse generator circuit including a capacitor and an output load impedance connected in series and a switch connected thereacross, means for supplying the difference between the transducer and reference signals to said circuit, means for opening said switch during predetermined intervals to charge said capacitor and reclosing the switch to discharge the capacitor through said load impedance, whereby output signal pulses of amplitude varying with said signal difference are produced, means for lengthening output signal pulses of at least one polarity, means for producing a wave varying in amplitude and cyclically recurring in synchronism with said A.-C. supply, means responsive to the instantaneous relative amplitudes of said lengthened pulses and cyclic wave for producing control pulses whose phase varies with the amplitude of said output signal pulses, and means for utilizing said control pulses to control said switching means.

19. A temperature control system which comprises switching means for cyclically switching an A.-C. supply to produce heating current pulses in a conductor, transducer means responsive to the temperature produced by said current pulses and yielding a corresponding electrical signal, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, said charging of the capacitor having a time constant substantially longer than said discharging thereof, whereby output signal pulses of amplitude varying with said signal difference are produced at the trailing edges of the open switch intervals, means for lengthening output signal pulses of one polarity corresponding to below temperature conditions, means for producing a wave varying in amplitude and cyclically recurring in synchronism with said A.-C. supply, means responsive to the instantaneous relative amplitudes of said lengthened pulses and cyclic wave for producing control pulses whose phase varies with the amplitude of said output signal pulses, and means for utilizing said control pulses to control the cyclic switching of said switching means.

20. A temperature control system which comprises switching means for cyclically switching an A.-C. supply to produce heating current pulses in a conductor, transducer means responsive to the temperature produced by said current pulses and yielding a corresponding electrical signal, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, said charging of the capacitor having a time constant substantially longer than said discharging thereof, whereby output signal pulses of amplitude varying with said signal difference are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, means for producing lengthened pulses having initial amplitudes corresponding to the amplitudes of respective gated signal pulses and decaying thereafter, means for producing a wave varying in amplitude during a lengthened pulse interval and cyclically recurring in synchronism with said pass intervals, means responsive to the instantaneous relative amplitudes of said lengthened pulses and cyclic wave for producing respective control pulses whose phase-back increases with decreasing amplitude of said gated signal pulses, and means for utilizing said control pulses to control the cyclic switching of said switching means to decrease the duration of said heating current pulses as said phaseback increases, the decay of said lengthened pulses and the amplitude variation of said wave being selected to increase the rate of change of said phaseback as the gated signal pulses become smaller.

21. A temperature control system which comprises switching means for cyclically switching an A.-C. supply to produce heating current pulses in a conductor, transducer means responsive to the temperature produced by said current pulses and yielding a corresponding electrical signal, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for opening said switch during intervals between said current pulses to charge said cpacitor and reclosing the switch to discharge the capacitor through said load impedance, said charging of the capacitor having a time constant sufficiently long to integrate frequency components substantially higher than the components of said signal and substantially longer than the time constant of discharging thereof, whereby output signal pulses of amplitude varying with said signal difference are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, means for producing lengthened pulses having initial amplitudes corresponding to the amplitudes of respective gated signal pulses and decaying thereafter, means for producing a wave having a substantially sinusoidal variation during a lengthened pulse interval and cyclically recurring in synchronism with said pass intervals, means responsive to the instantaneous relative amplitudes of said lengthened pulses and cyclic wave for producing respective control pulses whose phase-back increases with decreasing amplitude of said gated signal pulses, and means for utilizing said control pulses to control the cyclic switching of said switching means to decrease the duration of said heating current pulses as said phase-back increases.

22. A temperature control system which comprises switching means for cyclically switching an A.-C. supply to produce heating current pulses, transducer means responsive to the temperature produced by said current pulses and yielding a corresponding electrical signal, a reference electrical signal source, means for producing signal pulses varying in amplitude with changes in said transducer signal relative to the reference signal, means utilizing said signal pulses for producing control signals of phase varying with the amplitude of signal pulses of one polarity, and means for utilizing said control signals to control said switching means.

23. A temperature control system which comprises switching means for cyclically switching an A.-C. supply to produce heating current pulses, transducer means responsive to the temperature produced by said current pulses and yielding a corresponding electrical signal, a reference electrical signal source, means for producing signal pulses varying in amplitude with changes in said transducer signal relative to the reference signal, said signal pulses recurring in synchronism with said A.-C. supply, means for producing a wave varying in amplitude and cyclically recurring in synchronism with said A.-C. supply, means responsive to the instantaneous relative amplitudes of signal pulses of one polarity and said cyclic wave for producing control pulses whose phase varies with the amplitude of the signal pulses, and means for utilizing said control pulses to control said switching means.

24. A temperature control system which comprises switching means for cyclically switching an A.-C. supply to produce heating current pulses, transducer means responsive to the temperature produced by said current pulses and yielding a corresponding electrical signal, a reference electrical signal source, means for producing signal pulses varying in amplitude with changes in said transducer signal relative to the reference signal, said signal pulses recurring in synchronism with said A.-C. supply, means for producing lengthened pulses having initial amplitudes corresponding to the amplitudes of respective signal pulses of one polarity representing below temperature conditions and decaying thereafter, means for producing a wave varying in amplitude during a lengthened pulse interval and cyclically recurring in synchronism with said A.-C. supply, means responsive to the instantaneous relative amplitudes of said lengthened pulses and cyclic wave for producing respective control pulses whose phase-back increases with decreasing amplitude of said signal pulses, and means for utilizing said control pulses to control the cyclic switching of said switching means to decrease the duration of said heating current pulses as said phase-back increases, the decay of said lengthened pulses and the amplitude variation of said wave being selected to increase the rate of change of said phase-back as the signal pulses become smaller.

25. A temperature control system which comprises first switching means for cyclically switching an A.-C. supply to produce heating current pulses in an object, a transducer attached to said object for producing an electrical signal varying with the temperature thereof, a reference electrical signal source, means for combining said transducer and reference signals and supplying the combined signal to a signal pulse generator circuit including a capacitor, a load impedance and second switching means, means for operating said second switching means to supply said combined signal to said capacitor during predetermined intervals between said current pulses to charge the capacitor and to discharge the capacitor through said load impedance during the intervening intervals, and means for utilizing output signal pulses from said generator circuit to control said first switching means.

26. A temperature control system which comprises switching means for cyclically switching an A.-C. supply to produce heating current pulses in an object, a transducer attached to said object for producing an electrical signal varying with the temperature thereof, a reference electrical signal source, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, and means for utilizing output signal pulses from said generator circuit to control said switching means.

27. A temperature control system which comprises switching means for cyclically switching an A.-C. supply to produce heating current pulses in an object, a transducer attached to said object for producing an electrical signal varying with the temperature thereof, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, said charging of the capacitor having a time constant sufficiently long to integrate frequency components substantially higher than the components of said signal and substantially longer than the time constant of discharging thereof, and means for utilizing output signal pulses of one polarity from said generator circuit to control the cyclic switching of said switching means.

28. A temperature control system which comprises switching means for cyclically switching an A.-C. supply to produce heating current pulses in an object, a transducer attached to said object for producing an electrical signal varying with the temperature thereof, a reference electrical signal source, a signal pulse generator circuit including a capacitor and an output load impedance connected in series and a switch connected thereacross, means for supplying the difference between the transducer and reference signals to said circuit, means for opening said switch during intervals between said current pulses to charge said capacitor and reclosing the switch to discharge the capacitor through said load impedance, whereby output signal pulses are produced at the trailing edges of the open switch intervals respectively, gating means having pass intervals coinciding with pulses produced at the trailing edges of predetermined open switch intervals but phased to prevent passage of pulses produced at the leading edges thereof, and means for utilizing signal pulses from said gating means to control the cyclic switching of said switching means.

29. A temperature control system which comprises switching means for cyclically switching an A.-C. supply to produce heating current pulses in an object, a transducer attached to said object for producing an electrical signal varying with the temperature thereof, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for operating said switch synchronously with said A.-C. supply to open said switch during relatively short intervals between said current pulses to charge said capacitor proportionally to said signal difference and to reclose the switch during the intervening relatively long intervals to substantially short-circut said series circuit and discharge the capacitor through said load impedance, said charging of the capacitor having a time constant substantially longer than said discharging thereof, whereby output signal pulses are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, and means for utilizing signal pulses from said gating and clipping means to control the cyclic switching of said switching means.

30. A temperature control system which comprises first switching means for cyclically switching an A.-C. supply to produce heating current pulses in an object, a transducer attached to said object for producing an electrical signal varying with the temperature thereof, a reference electrical signal source, means for combining said transducer and reference signals and supplying the combined signal to a signal pulse generator circuit including a capacitor, a load impedance and second switching means, means for operating said second switching means to supply said combined signal to said capacitor during predetermined intervals between said current pulses to charge the capacitor and to discharge the capacitor through said load impedance during the intervening intervals, whereby output signal pulses of varying amplitude are obtained, means utilizing said signal pulses for producing control signals of phase varying with the amplitude of signal pulses of one polarity, and means for utilizing said control signals to control said first switching means.

31. A temperature control system which comprises switching means for cyclically switching an A.-C. supply to produce heating current pulses in an object, a transducer attached to said object for producing an electrical signal varying with the temperature thereof, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, said charging of the capacitor having a time constant substantially longer than said discharging thereof, whereby output signal pulses are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, means for lengthening gated signal pulses of said one polarity, means for producing a wave varying in amplitude and cyclically recurring in synchronism with said A.-C. supply, means responsive to the instantaneous relative amplitudes of said lengthened pulses and cyclic wave for producing control pulses whose phase varies with the amplitude of said output signal pulses, and means for utilizing said control pulses to control the cyclic switching of said switching means.

32. A temperature control system which comprises switching means for cyclically switching an A.-C. supply to produce heating current pulses in an object, a transducer attached to said object for producing an electrical signal varying with the temperature thereof, a source of a reference electrical signal corresponding to a desired temperature program, a signal pulse generator circuit including a capacitor and an output load impedance connected in series and a switch connected thereacross, means for supplying the difference between the transducer and reference signals to said circuit, means for operating said switch synchronously with said A.-C. supply to open said switch during relatively short intervals between said current pulses to charge said capacitor proportionally to said signal difference and to reclose the switch during the intervening relatively long intervals to substantially short-circuit said series circuit and discharge the capacitor through said load impedance, said charging of the capacitor having a time constant sufficiently long to integrate frequency components substantially higher than the components of said signal and substantially longer than the time constant of discharging thereof, whereby output signal pulses of amplitude varying with said signal difference are produced at the trailing edges of the open switch intervals, gating and clipping means having pass intervals for signal pulses of only one polarity corresponding to below temperature conditions, said pass intervals coinciding with trailing edge pulses of predetermined open switch intervals but phased to prevent passage of leading edge pulses thereof, means for producing lengthened pulses having initial amplitudes corresponding to the amplitudes of respective gated signal pulses and decaying thereafter, means for producing a wave having a substantially sinusoidal variation during a lengthened pulse interval and cyclically recurring in synchronism with said pass intervals, means responsive to the instantaneous relative amplitudes of said lengthened pulses and cyclic wave for producing respective control pulses whose phase-back increases with decreasing amplitude of said gated signal pulses, and means for utilizing said control pulses to control the cyclic switching of said switching means to decrease the duration of said heating current pulses as said phase-back increases.

References Cited in the file of this patent

UNITED STATES PATENTS

| | | |
|---|---|---|
| 2,646,544 | Sands | July 21, 1953 |
| 2,829,231 | Troost | Apr. 21, 1958 |
| 2,838,644 | Rolfson et al. | June 10, 1058 |
| 2,857,104 | Gilbert | Oct. 21, 1958 |

OTHER REFERENCES

Pochapsky: Review of Scientific Instruments, vol. 25, No. 3, March 1954 (pp. 238–242).

Eubank: Review of Scientific Instruments, vol. 21, No. 10, Oct. 1950 (pp. 845–851).